(12) United States Patent
Kawabe et al.

(10) Patent No.: US 8,402,953 B2
(45) Date of Patent: Mar. 26, 2013

(54) ENGINE

(75) Inventors: Takao Kawabe, Osaka (JP); Takashi Miyamoto, Osaka (JP); Terumitsu Takahata, Osaka (JP); Tetsuo Sakaki, Kanagawa (JP); Isamu Kawashima, Kanagawa (JP)

(73) Assignee: Yanmar Co., Ltd., Osaka (JP)

( * ) Notice: Subject to any disclaimer, the term of this patent is extended or adjusted under 35 U.S.C. 154(b) by 412 days.

(21) Appl. No.: 12/743,118

(22) PCT Filed: Nov. 11, 2008

(86) PCT No.: PCT/JP2008/070463
§ 371 (c)(1),
(2), (4) Date: May 14, 2010

(87) PCT Pub. No.: WO2009/066578
PCT Pub. Date: May 28, 2009

(65) Prior Publication Data
US 2010/0250101 A1    Sep. 30, 2010

(30) Foreign Application Priority Data

Nov. 20, 2007  (JP) ................................ 2007-301010

(51) Int. Cl.
*F02B 33/00* (2006.01)

(52) U.S. Cl. ..................................... 123/559.1; 123/478

(58) Field of Classification Search .................. 701/104, 701/112, 113; 123/559.1, 478, 480
See application file for complete search history.

(56) References Cited

U.S. PATENT DOCUMENTS

| 6,161,383 A * | 12/2000 | Aschner et al. ................. 60/602 |
| 2008/0189024 A1 * | 8/2008 | Kondo .......................... 701/102 |

FOREIGN PATENT DOCUMENTS

JP    63-248920    10/1988
(Continued)

OTHER PUBLICATIONS

English Translation of Notification of Reasons for Refusal issued in corresponding JP Application No. 2007-301010, Japanese Patent Office, mailed Nov. 1, 2011, 2 pages.

(Continued)

*Primary Examiner* — John Kwon
(74) *Attorney, Agent, or Firm* — Sterne, Kessler, Goldstein & Fox P.L.L.C.

(57) ABSTRACT

It is an object to provide an engine that makes it possible to constantly detect the number of rotations of a supercharger with a calculation load of an ECU reduced. An engine 1 is provided with an engine base 8 comprised of a plurality of cylinders and a turbocharger 7, a crank angle sensor 4, a turbo sensor 5 that detects rotations of the turbocharger 7 as pulses, an amplifier 11 that divides the pulses by an arbitrary division ratio and calculates the divided pulses, and an ECU 10 that judges a surge condition of the turbocharger 7, wherein the ECU 10 sets a predetermined position of a piston of each cylinder in a crank angle of the engine base 8 to count start timing of the divided pulses, outputs the divided pulses counted from the count start timing to the number of predetermined rotations as a first output, and judges that, if a difference between the first outputs at every cylinder is more than a predetermined value, the turbocharger 7 is in the surge condition.

3 Claims, 12 Drawing Sheets

| FOREIGN PATENT DOCUMENTS | | |
|---|---|---|
| JP | 04-041960 | 2/1992 |
| JP | 04-287834 | 10/1992 |
| JP | 2003-240788 | 8/2003 |
| JP | 2005-220863 | 8/2005 |
| JP | 2005-299618 | 10/2005 |

OTHER PUBLICATIONS

International Search Report for International Application No. PCT/JP2008/070463, Japanese Patent Office mailed Dec. 9, 2008, 2 pgs.

* cited by examiner

ENGINE

TECHNICAL FIELD

The present invention relates to an engine having a supercharger.

BACKGROUND ART

Conventionally, there is well known an engine having a turbocharger. The turbocharger is a supercharger that a turbine is rotated by energy of exhaust and supercharging is performed with sucked air by a compressor. When the compressor is at a surge state, the turbocharger cannot be used. The surge state can be detected by a turbo sensor, supercharging pressure sensor, $\lambda$ sensor or the like. For example, with regard to an engine disclosed in the Japanese Patent Laid Open Gazette 2003-240788, the surge state is detected by an airflow sensor.

However, an airflow sensor or a $\lambda$ sensor is disadvantageous because it is expensive. The airflow sensor or the $\lambda$ sensor is also disadvantageous because it is difficult to avoid certainly the surge state at highland at which air pressure is different from that at flatland. The engine disclosed in the Japanese Patent Laid Open Gazette 2003-240788 is disadvantageous because signals responding to change of pressure are watched constantly, thereby increasing calculation load on an ECU (Engine Control Unit).

DISCLOSURE OF INVENTION

Problems to be Solved by the Invention

The purpose of the present invention is to provide an engine that makes it possible to constantly detect rotation speed of a supercharger with calculation load reduced.

Means for Solving the Problems

The engine according to the present invention comprises an engine base having a plurality of cylinders and a supercharger; an engine rotation speed detection means; a supercharger rotation speed detection means that detects rotation of the supercharger as a pulse; an operation means that divides the pulse by an optional dividing ratio and calculates it as a divided pulse; and a control means that judges a surge state of the supercharger, wherein the control means sets a predetermined position of a piston of each of the cylinders in a crank angle of the engine as count start timing of the divided pulses, outputs the divided pulse counted for predetermined number from the count start timing as a first output, and judges that, if a difference between the first outputs of every cylinder is not less than a predetermined value, the supercharger is in the surge state.

The engine according to the present invention comprises an engine base having a plurality of cylinders and a supercharger; an engine rotation speed detection means; a supercharger rotation speed detection means that detects rotation of the supercharger as a pulse; an operation means that divides the pulse by an optional dividing ratio and calculates it as a divided pulse; and a control means that regulates fuel injection amount, wherein the control means sets the pulse divided by a predetermined dividing ratio as a first divided pulse, sets a predetermined position of a piston of each of the cylinders in a crank angle of the engine as count start timing of the divided pulses, outputs the divided pulse counted from the count start timing for predetermined number as a first output, outputs a second divided pulse divided by larger dividing ratio than the first divided pulse as a second output, judges the cylinder that difference between the first output and the second output to be a fuel injection amount mismatching cylinder, and regulates fuel injection amount of the fuel injection amount mismatching cylinder so as to make the difference not more than predetermined value.

The engine according to the present invention comprises an engine base having a plurality of cylinders and a supercharger; an engine rotation speed detection means; a supercharger rotation speed detection means that detects rotation of the supercharger as a pulse; an operation means that divides the pulse by an optional dividing ratio and calculates it as a divided pulse; and a control means that judges whether the engine is extraordinary or not and regulates fuel injection amount so as to reduce speed of the engine when the engine is judged to be extraordinary, wherein when the engine is judged to be extraordinary, the control means sets the pulse divided by a predetermined dividing ratio as a first divided pulse, sets a predetermined position of a piston of each of the cylinders in a crank angle of the engine as count start timing of the divided pulses, outputs the divided pulse counted from the count start timing for predetermined number as a first output, outputs a second divided pulse divided by larger dividing ratio than the first divided pulse as a second output, and regulates the fuel injection amount so as to make the second output in agreement with the minimum output of the first outputs in one cycle.

Effect of the Invention

The engine of the present invention makes it possible to constantly detect the number of rotations of a supercharger with a calculation load reduced

THE BEST MODE FOR CARRYING OUT THE INVENTION

Figure 1:
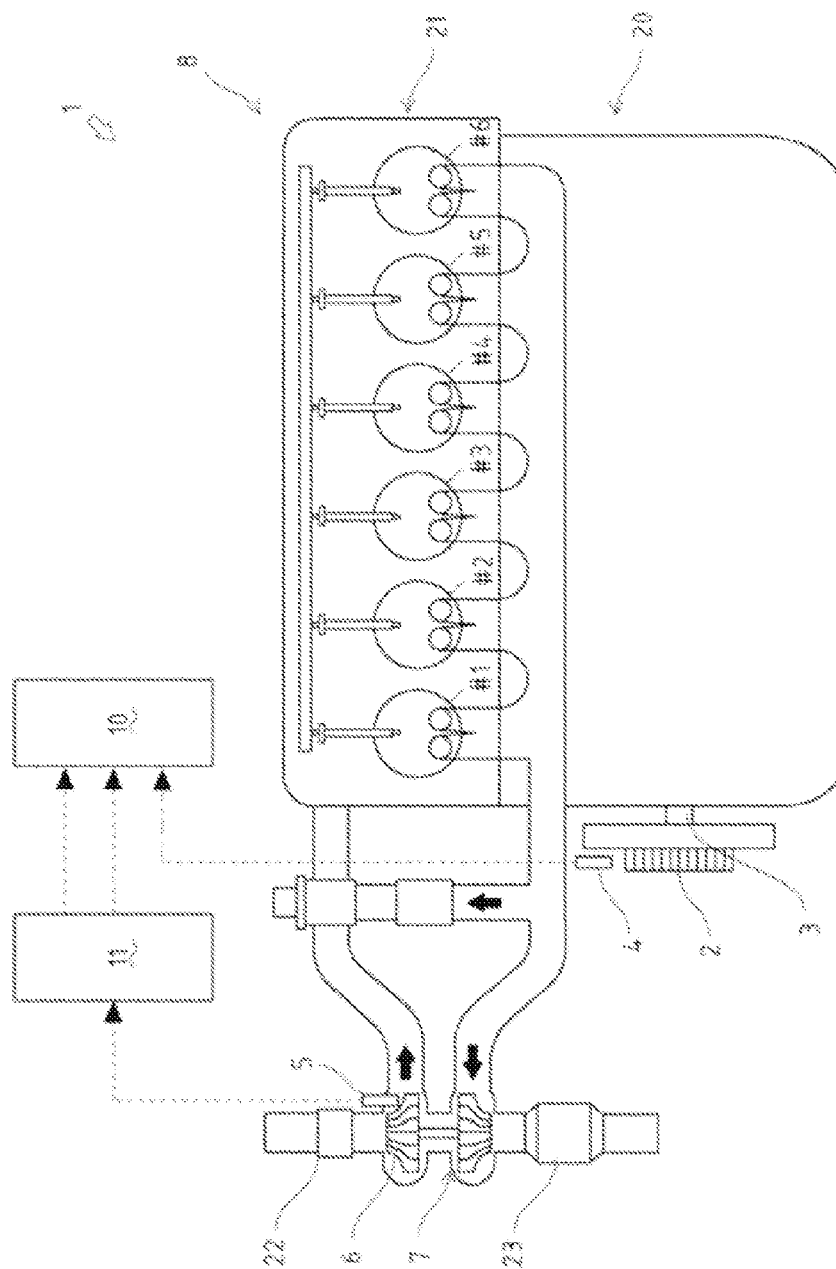
FIG. 1 It is a schematic drawing of an engine according to an embodiment of the present invention.

Explanation will be given on an engine 1 which is an embodiment of the present invention referring FIG. 1. The engine 1 has an engine base 8, a crank angle sensor 4 as an engine rotation speed detection means, an amplifier 11 as an operation means, a turbo sensor 5 as a supercharger rotation speed detection means, and an ECU (Engine Control Unit) 10 as a control means.

The engine base 8 is a 6-cylindered diesel engine having a turbocharger 7 as a supercharger. The engine base 8 has a cylinder block 20 and a cylinder head 21. In the cylinder head 21, an intake manifold is connected to an intake path via a compressor 6 and an air cleaner 22 of the turbocharger 7, and an exhaust manifold is connected to an exhaust path via a turbine and muffler 23 of the turbocharger 7.

A crankshaft 3 is pivotally supported on the cylinder block 20. A pulser 2 is fixed on the crankshaft 3 and the crank angle sensor 4 is arranged oppositely to the pulser 2.

Figure 2:
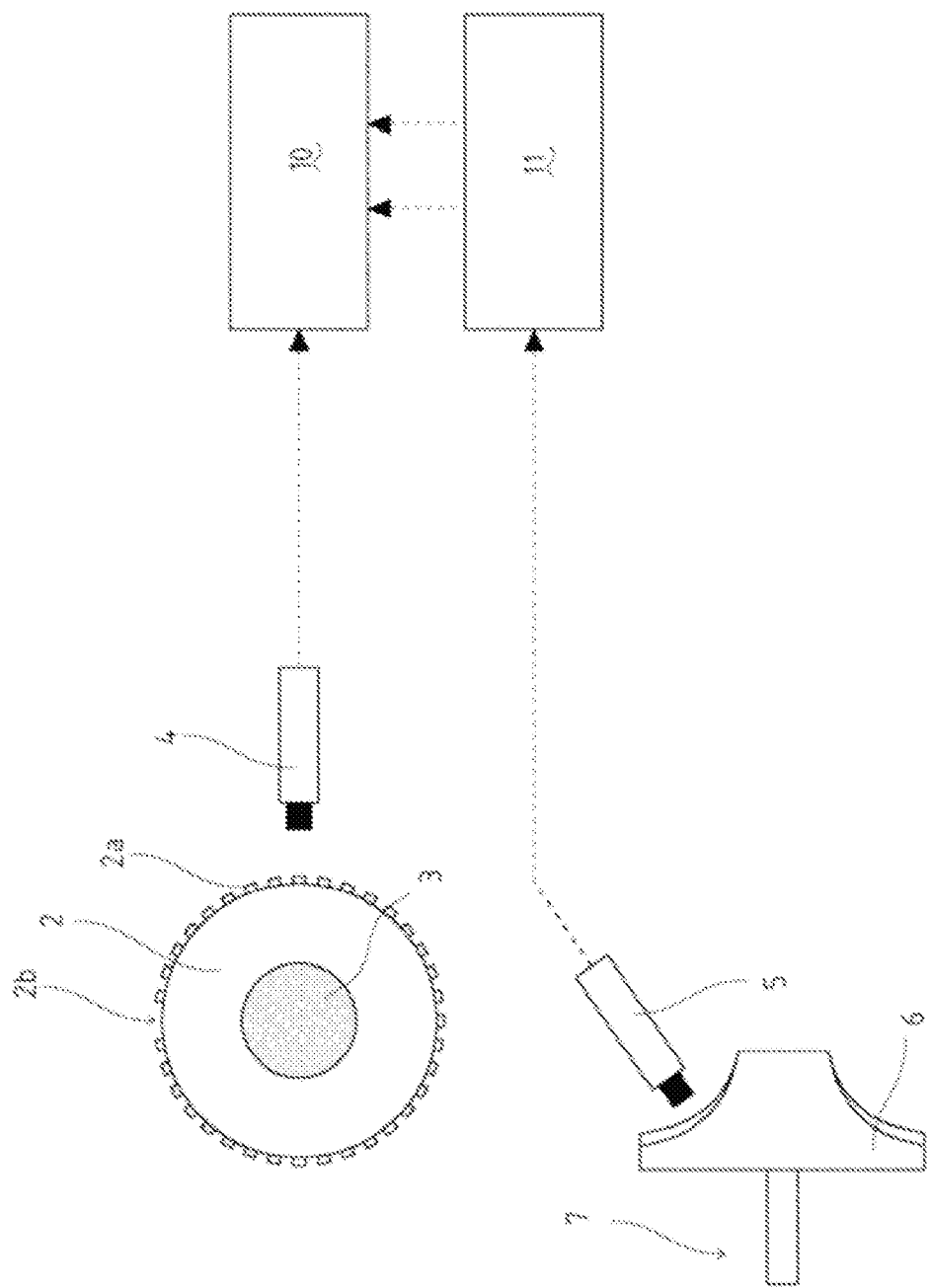
FIG. 2 It is a schematic drawing of a crank angle sensor and a turbo sensor of the same.

Explanation will be given on the construction of the crank angle sensor 4 and the turbo sensor 5 referring FIG. 2.

The crank angle sensor 4 is arranged oppositely to the pulser 2. The pulser 2 is an angle disc fixed to the crankshaft 3 and rotated integrally with the crankshaft 3. Pulses 2a are formed in the perimeter of the pulser 2 at regular intervals so that the pulser 2 is constructed gear-like. The pulses 2a are formed at 60 PLS/ver. A blank 2b of the pulses is formed in the pulser 2. In this embodiment, the number of the pulses is not limited.

According to this construction, the crank angle sensor 4 detects the unevenness of the pulser 2. An output signal is regarded as a pulse signal, and the angle of the crankshaft 3 is detected by counting the number of the pulses 2a from the blank 2b as a reference point. Position of a piston of each cylinder (a top dead point (TDC), a bottom dead point (BDC) and the like) can be detected from the angle of the crankshaft 3. An electromagnetic pick-up sensor or a hall sensor is used as the crank angle sensor 4. However, in this embodiment, the type of the sensor is not limited, and a distance sensor, an optical sensor, an electrostatic sensor or the like may alternatively be used.

The turbo sensor 5 is arranged at the side of the compressor 6 in the turbocharger 7. The turbo sensor 5 detects an indicator provided on wings of the compressor 6. The number of the wings of the compressor 6 is 14. However, in this embodiment, the number of the wing may not be limited. The means detecting the indicator provided on the wings is not limited and may alternatively be a magnetic sensor, electrostatic sensor or the like.

The ECU 10 is a controller performing synthetically electric control for driving the engine 1. The crank angle sensor 4 and the turbo sensor 5 via the amplifier 11 are connected to the ECU 10.

Figure 3:
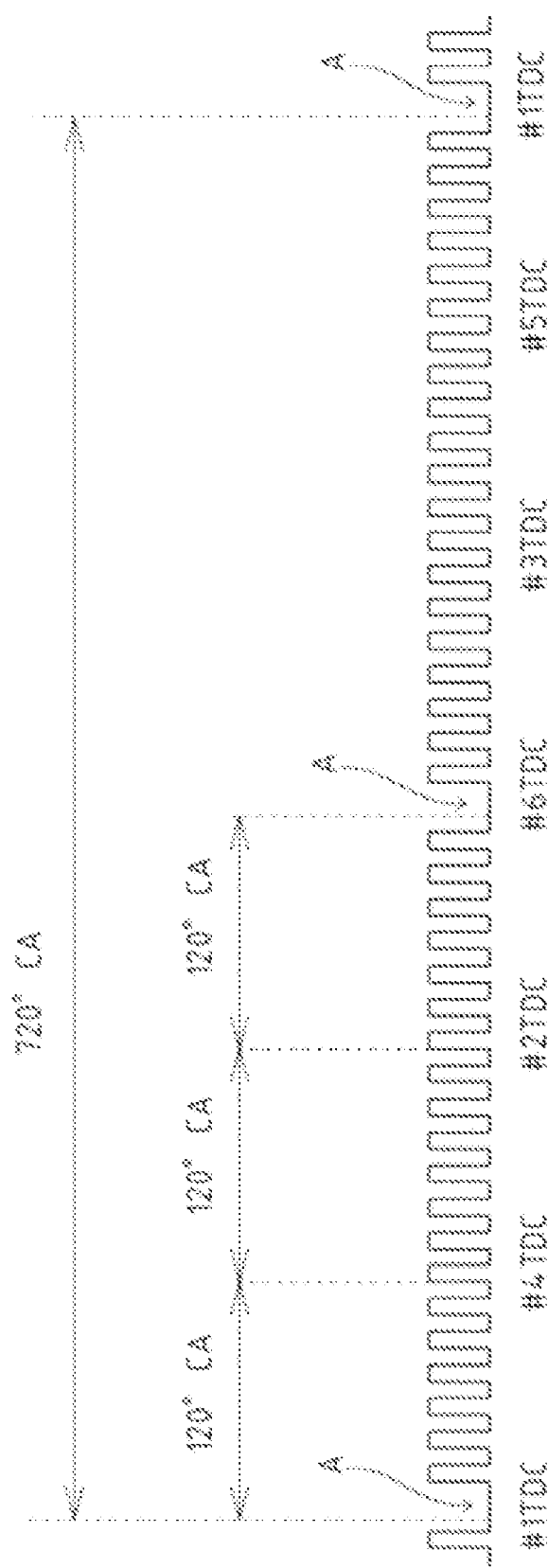
FIG. 3 It is a graph of time series pulse output of the engine rotation of the same.

Explanation will be given on the pulse output detected by the crank angle sensor 4 referring FIG. 3. FIG. 3 shows the time series change of the pulse output of the engine rotation. With regard to the engine 8, all the cylinders (#1 to #6) perform work so as to rotate the crankshaft 3, that is, the pulser 2 twice. The order of the injection is #1, #4, #2, #6, #3, and then #5.

According to this construction, the unevenness of the pulser 2 is detected by the crank angle sensor 4 and then transmitted to the ECU 10 as the pulse output. In the pulse output, the blank 2b of the pulser 2 generates one point at which the pulse is not outputted per one cycle (A in FIG. 3).

Figure 4:
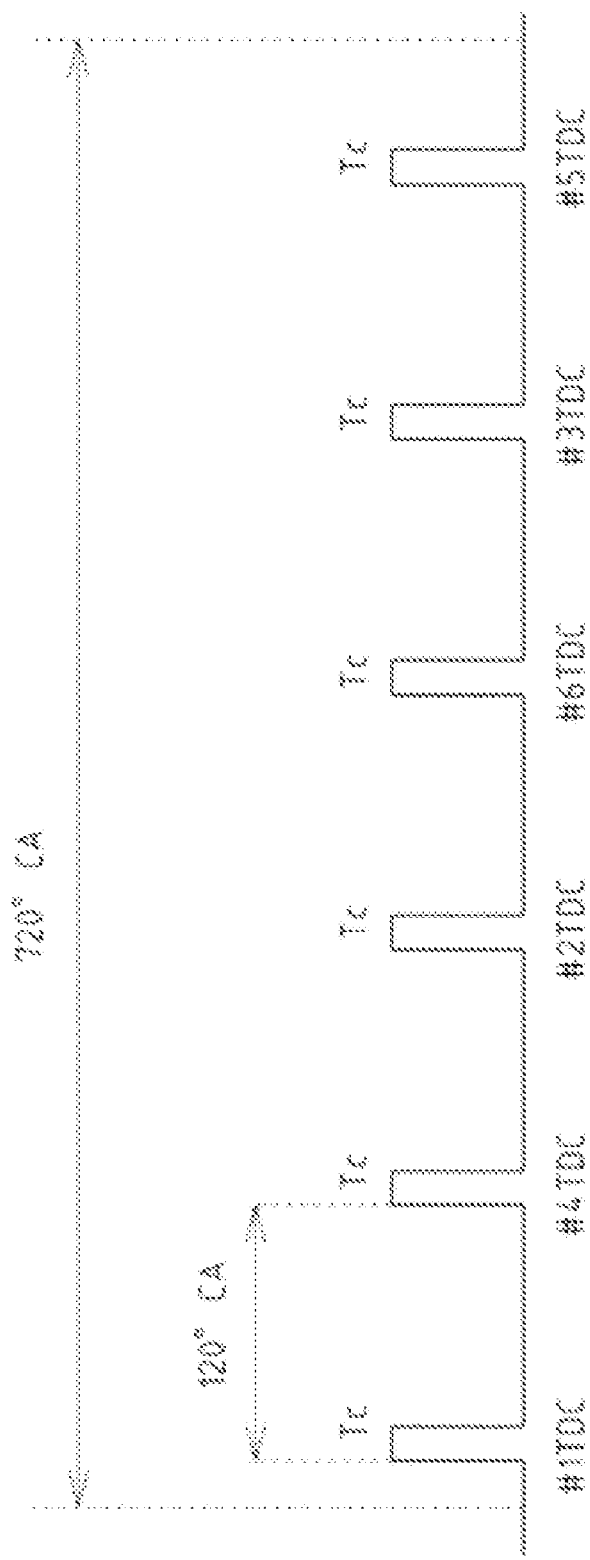
FIG. 4 It is a graph of operation timing of the same.

Explanation will be given on starting timing of count of divided pulse referring FIG. 4. In the pulser 2, by calculating the timing at intervals of 120° from A, a prescribed position common to each of the cylinders can be calculated. By compensating the prescribed position by calculation, the TDC, the BDC and the like can be calculated. The "starting timing of count of divided pulse" is defined as the position of the top dead point of the optional cylinder (#N) regardless of the numeric of the cylinders. The position of the top dead point of each of the cylinders in the rotation of the crankshaft 3 is referred to as the starting timing of count of divided pulse Tc and is used for measurement of rotation speed of the supercharger of the turbocharger 7. The starting timing of count of divided pulse Tc must not limited to the top dead point.

Explanation will be given on dividing ratio referring FIG. 5. "Dividing with dividing ratio N" means exchanging frequency into 1/N. In this case, the frequency of the pulses is 14 so as to output 14 pulses per 1/6 rotation of the compressor. Dividing the frequency of the pulses with dividing ratio 7 means exchanging the frequency into 1/7, therefore the frequency is exchanged into 2. The dividing ratio is set so as to be optimized with the frequency responsibility of the ECU 10 and resolution in the case of converting into a bit. The dividing ratio may alternatively be a prime, such as 19 or 7.

Figure 5:
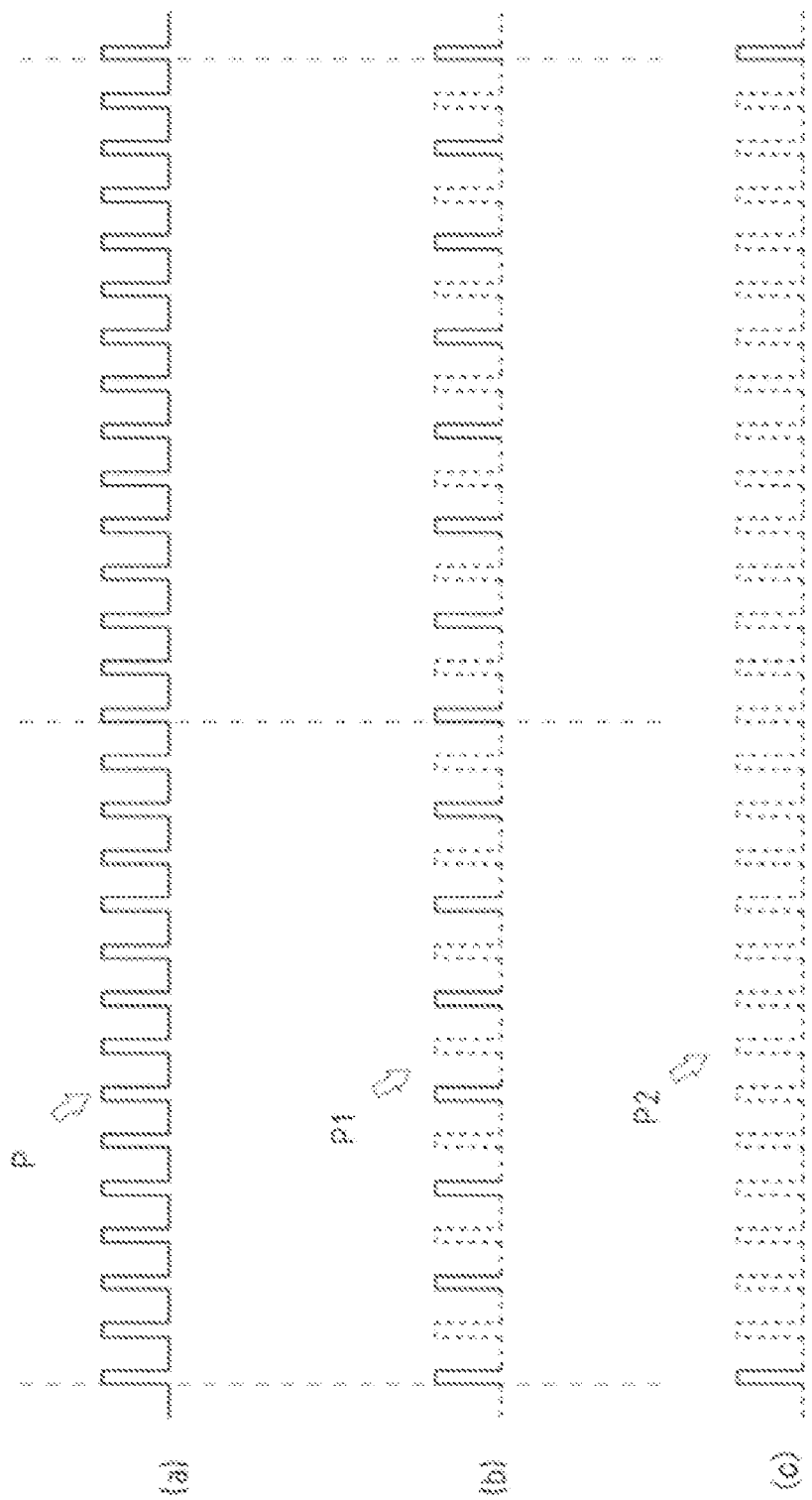
FIG. 5 It is a graph of divided pulse of supercharger rotation of the same.

FIG. 5(*a*) shows pulse output P of the turbo sensor 5. 14 pulses are outputted per 1/6 rotation of the compressor. Namely, the pulse output P is a pulse divided with dividing ratio 1, and may be regarded as the pulse output measured directly.

FIG. 5(*b*) shows first pulse outputs P1 that the pulse output P divided with dividing ratio 2. 7 pulses are outputted per 1/6 rotation of the compressor.

FIG. 5(*c*) shows second pulse outputs P2 that the pulse output P divided with dividing ratio 28. 1 pulse is outputted per 2/6 rotation of the compressor.

Accordingly, the pulse output of the supercharger is transmitted as the divided pulse to the ECU 10 so that continuous load is not applied on the ECU 10.

Figure 6:
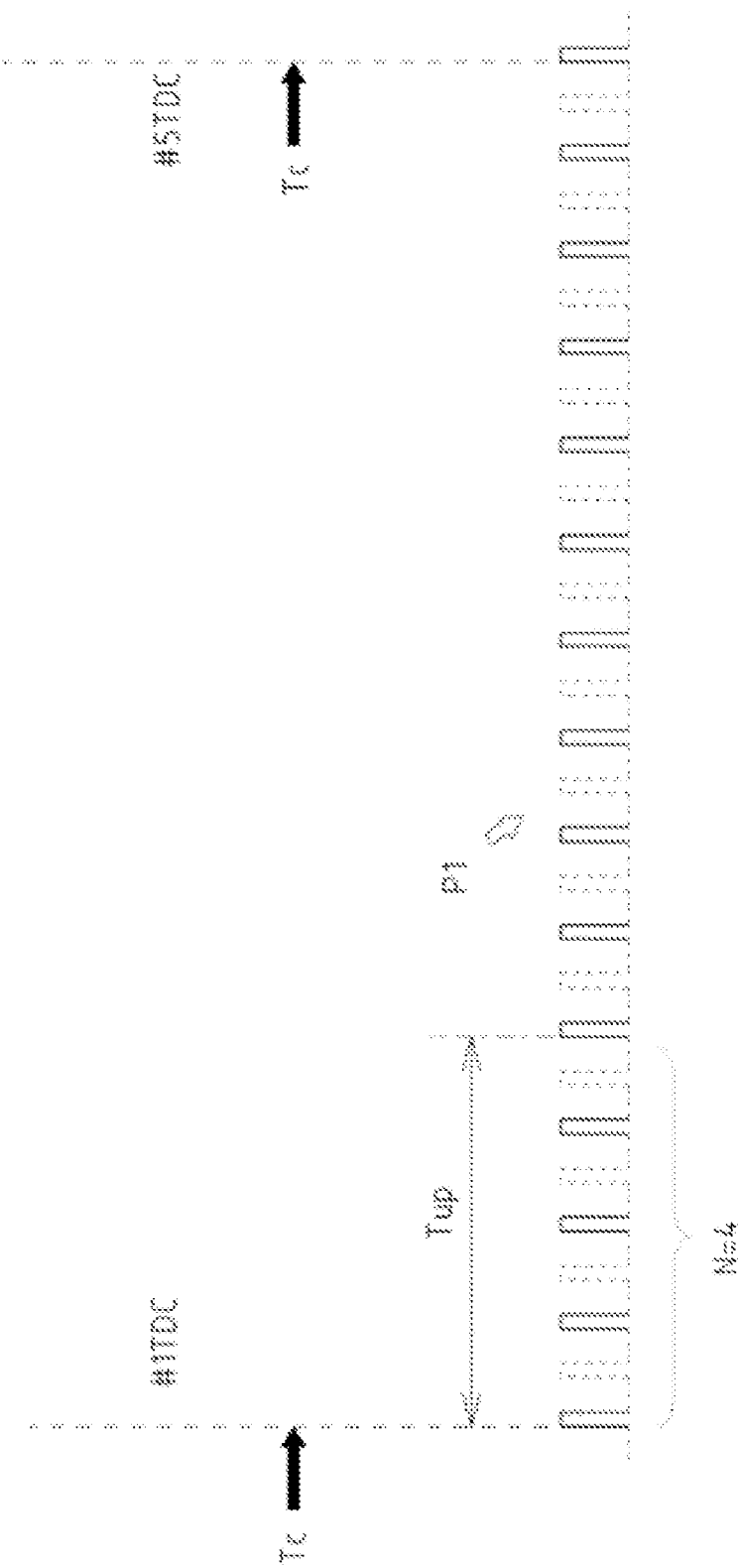
FIG. 6 It is a graph of first outputs of the same.

Explanation will be given on first outputs outputted by the ECU 10 referring FIG. 6. Time for calculating prescribed number N times of the first pulse output P1 (divided pulse divided with dividing ratio 2) from the position of the top dead point of each of the cylinders as the starting timing of count of divided pulse Tc (a thick black arrow in FIG. 6, similar to latter drawings) (counter measurement time Tup) is operated so as to operate supercharger rotation speed. In this case, the prescribed number N can be set optionally. In this embodiment, the prescribed number N is 4. Namely, the first output is the supercharger rotation speed of the engine 1 just after the top dead point operated in a moment. Hereinafter, the first output is defined as supercharger rotation speed Nc1.

Accordingly, the first output Nc1 is operated intermittently the starting timing of count of divided pulse Tc based on the optional dividing ratio and crank angle, whereby supercharger rotation speed Nc of each of the cylinders can be obtained. Namely, without applying operation load on the ECU 10, the supercharger rotation speed of combustion cycle for each cycle and each cylinder can be measured, and in its turn the combustion state of the engine 1 including the state of the turbocharger 7 can be detected.

Explanation will be given on second outputs outputted by the ECU 10 (see FIG. 5(*c*)). The ECU 10 operates the second pulse output P2 as number of pulses per 1/6 rotation of the compressor and regards it as supercharger rotation speed. Namely, the second output is the supercharger rotation speed operated averagely. Hereinafter, the second output is defined as supercharger rotation speed Nc2.

Accordingly, the second output Nc2 is divided and operated with optional dividing ratio (28 in this embodiment), whereby the mean of supercharger rotation speed can be obtained. Namely, without applying operation load on the ECU 10, the mean supercharger rotation speed can be measured which is not affected by microscopic factors such as change of combustion cycle and change among the cylinders, and in its turn the combustion state of the engine 1 including the state of the turbocharger 7 can be detected.

Embodiment 1

Figure 7:
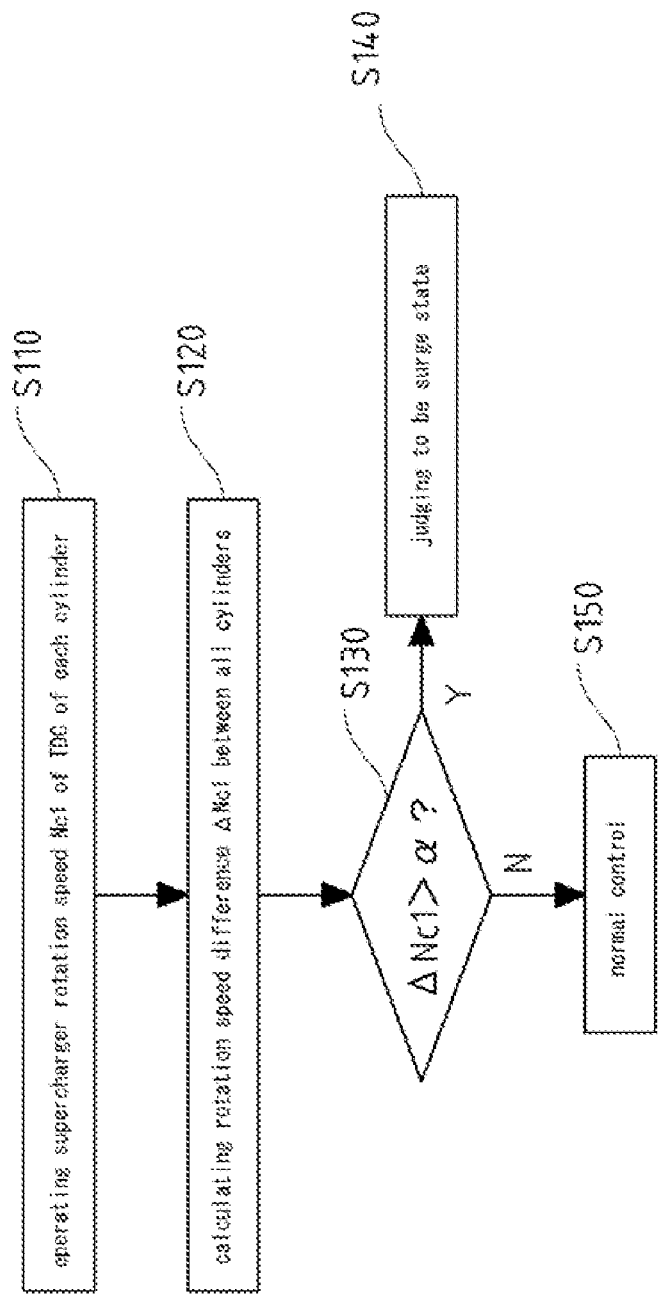
FIG. 7 It is a flow chart of surge judgment control of the same which is an embodiment 1.

Explanation will be given on surge judgment control which is an embodiment 1 referring FIG. 7. The ECU 10 compares the first outputs Nc1 of all the cylinders with each other so as to judge whether the turbocharger 7 is at a surge state or not.

The ECU 10 operates the first output Nc1 of each of the cylinders (S110). Next, the ECU 10 operates rotation speed difference ΔNc1 between all the cylinders (S120). Then, the ECU 10 judges whether the rotation speed difference ΔNc1 is larger than prescribed value α or not (S130). When rotation speed difference ΔNc1 between all the cylinders is not less than the prescribed value α, the ECU 10 judges that the turbocharger 7 is at the surge state (S140). On the other hand, each rotation speed difference ΔNc1 is not larger than the prescribed value α, the ECU 10 performs normal control (S150).

Accordingly, the first outputs Nc1 as intermittent supercharger rotation speed of all the cylinders are compared with each other as feedback value, whereby even a slight surge state which is difficult to be judged by a supercharger pressure sensor or the like can be detected correctly without applying operation load on the ECU 10. Namely, without using an expensive supercharger pressure sensor, air flow sensor or the like, the surge state can be detected correctly and quickly by only the turbo sensor 5.

Figure 8:
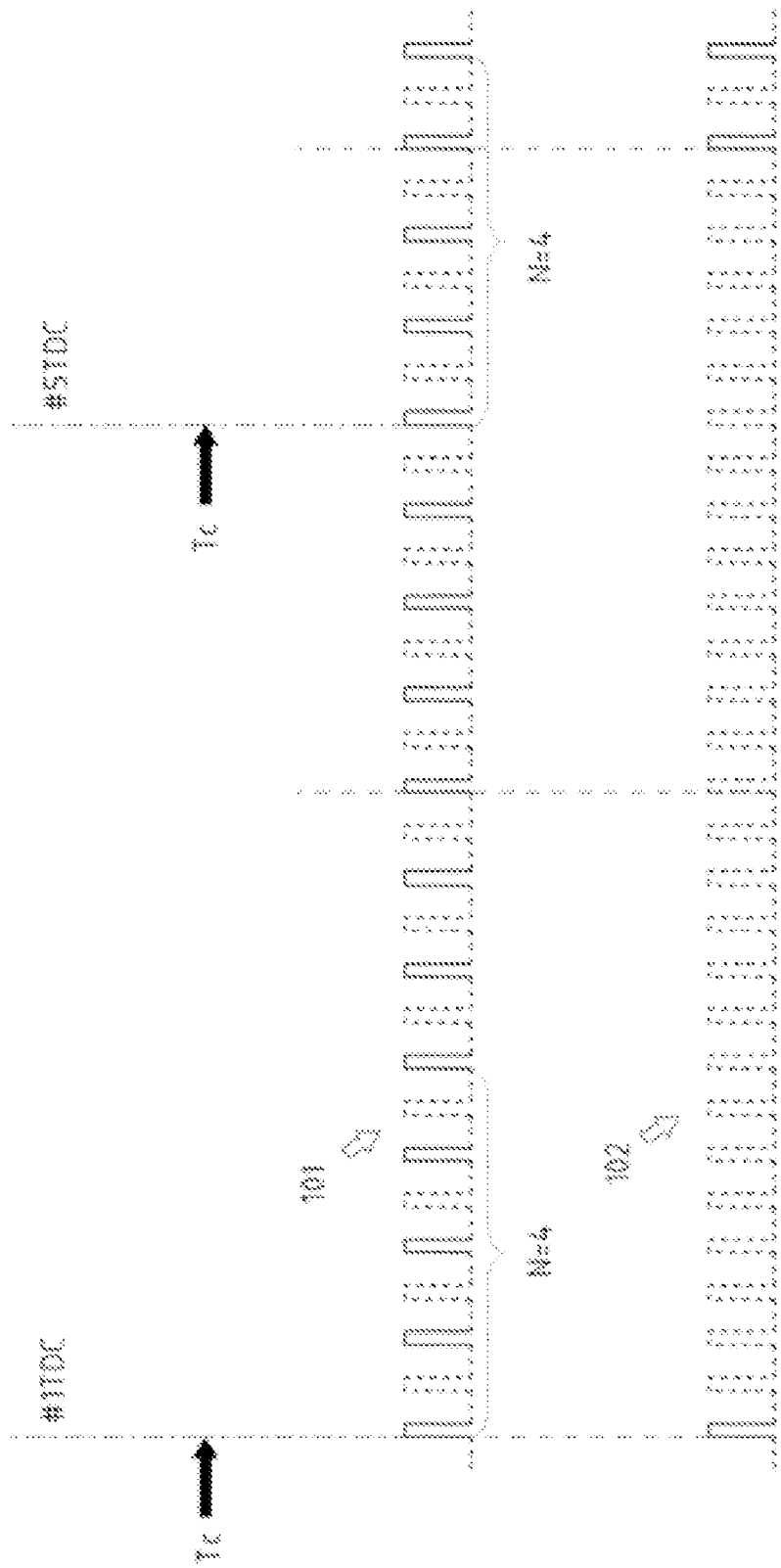
FIG. 8 It is a graph of first outputs and second outputs of the same.

Explanation will be given on comparison of the first output Nc1 with the second output Nc2 referring FIG. 8. The first output Nc1 is supercharger rotation speed operated from the starting timing of count of divided pulse Tc at the position of the top dead point of each of the cylinders of the engine 1 to the time at which the first pulse output P1 divided with dividing ratio 2 has been measured four times. On the other hand, the second output Nc2 is supercharger rotation speed that the second pulse output P2 divided with dividing ratio 28 is operated.

Accordingly, though the outputs as supercharger rotation speed are two (the first output Nc1 and the second output Nc2), the one turbo sensor 5 is used, thereby reducing part number of the engine 1. The two outputs can be compared with each other without considering an error of a single sensor. Even if one of the output systems is abnormal, the supercharger rotation speed can be detected certainly.

The dividing ratio of the first output Nc1 is set small (in this embodiment, the dividing ratio is 2) so as to obtain the function detecting the supercharger rotation speed in a moment intermittently, and the dividing ratio of the second output Nc2 is set large (in this embodiment, the dividing ratio is 28) so as to obtain the function detecting the mean supercharger rotation speed, whereby the state of the supercharger can be detected without applying operation load on the ECU 10.

Embodiment 2

Figure 9:
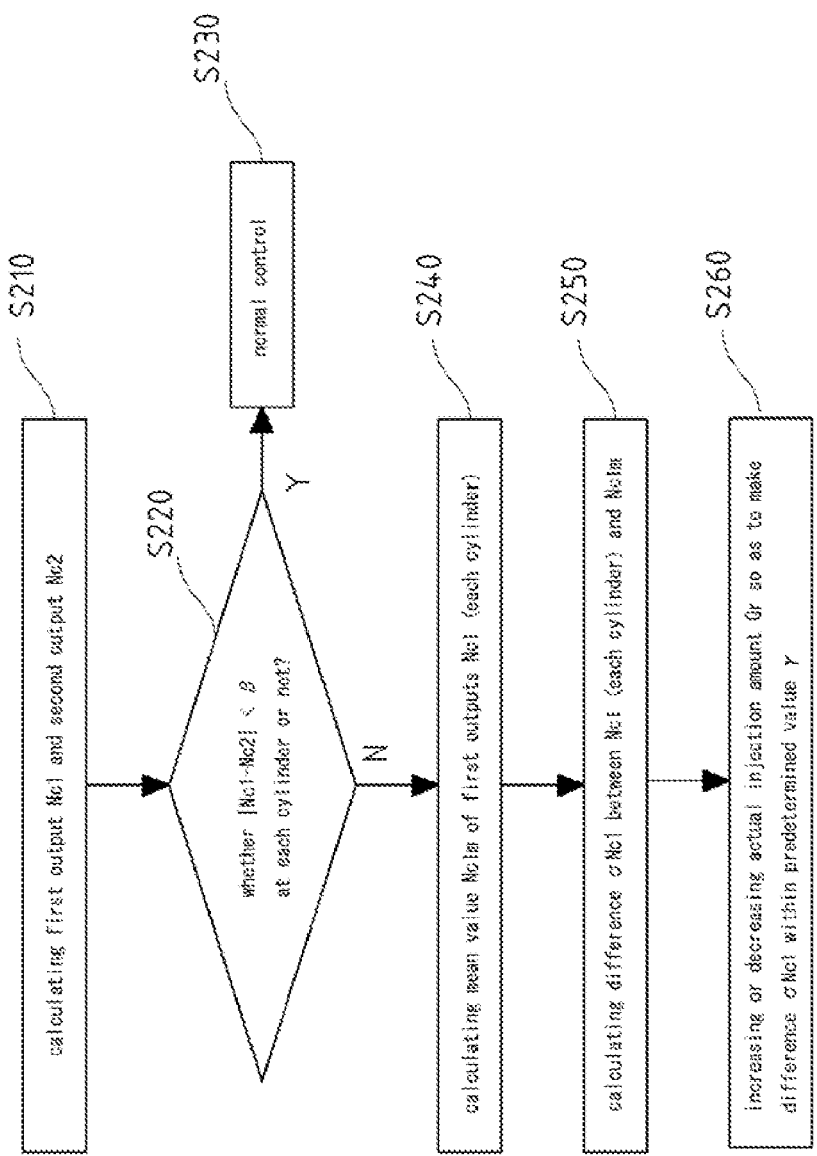
FIG. 9 It is a flow chart of first fuel injection amount compensation control of the same which is an embodiment 2.

Explanation will be given on first fuel injection amount compensation control which is an embodiment 2 referring FIG. 9. The ECU 10 detects dispersion of fuel injection amount among all the cylinders and compensates the dispersion with the first output Nc1 and the second output Nc2.

The ECU 10 calculates the first output Nc1 and the second output Nc2 (S210). Next, the ECU 10 checks whether the first output Nc1 is larger than the difference between the second output Nc2 and predetermined value β and is smaller than the second output Nc2 or not (S220). When the condition of the step S220 is satisfied, the ECU 10 performs normal control (S230).

On the other hand, when the condition of the step S220 is not satisfied, the ECU 10 calculates mean value Nc1$m$ of the first outputs Nc1 of all the cylinders (S240). Next, the ECU 10 calculates σNc1 which is difference between the first output Nc1 of each of the cylinders and the mean value Nc1$m$ (S250). The ECU 10 increases or decreases actual injection amount Qr of each of the cylinders so as to make σNc1 which is the difference between the first outputs Nc1 of all the cylinders converge to predetermined value y (S260).

According to the construction, at the step S220, momentary supercharger rotation speed at the time of fuel injection of each of the cylinders against the mean supercharger rotation speed can be judged. At the step S240, the first output Nc1, which is the momentary supercharger rotation speed of each of the cylinders, is converged so as to suppress the dispersion of fuel injection amount of each of the cylinders.

Accordingly, the two supercharger rotation speed outputs (the first output Nc1 and the second output Nc2) are compared with each other as feedback value, whereby the dispersion of fuel injection amount of each of the cylinders can be reduced without applying operation load on the ECU 10.

Embodiment 3

Figure 10:
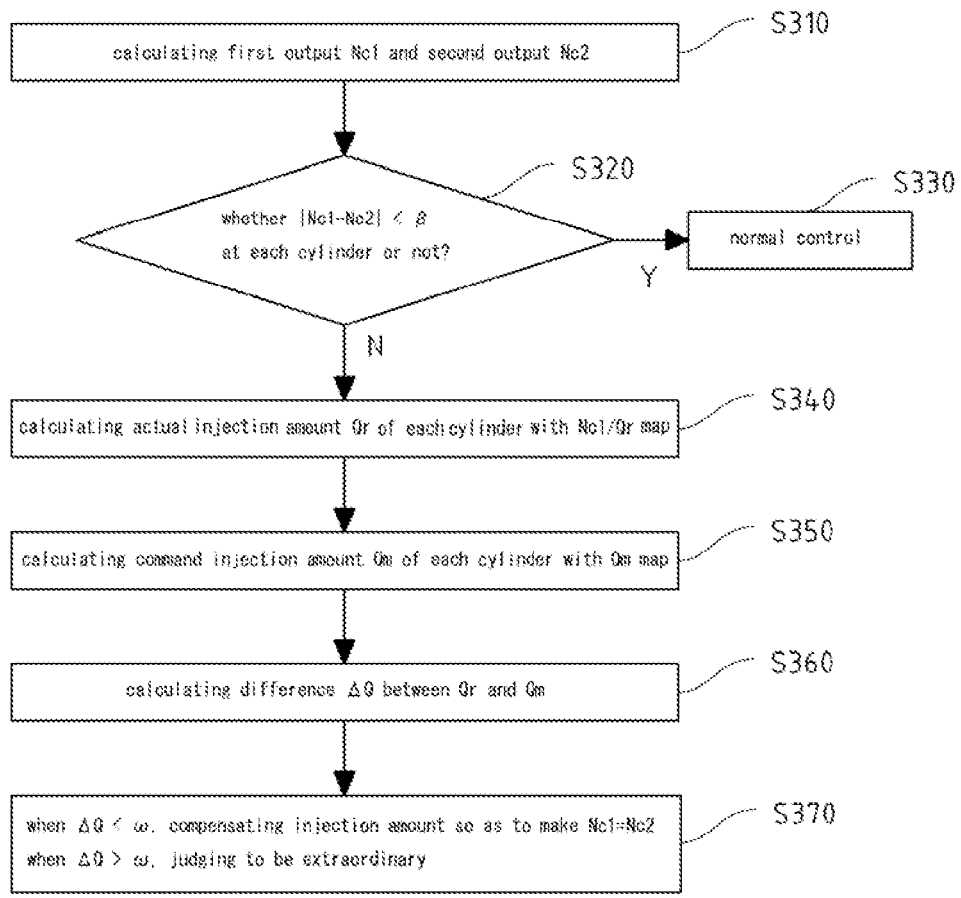
FIG. 10 It is a flow chart of second fuel injection amount compensation control of the same which is an embodiment 3.

Explanation will be given on second fuel injection amount compensation control which is an embodiment 3 referring FIG. 10. The ECU 10 detects engine extraordinariness with the first output Nc1 and the second output Nc2 and detects estrangement of fuel injection amount of each of the cylinders based on a fuel injection map, and then judges whether compensation or extraordinary processing should be performed.

The ECU 10 calculates the first output Nc1 and the second output Nc2 (S310). Next, the ECU 10 checks whether the first output Nc1 is larger than the difference between the second output Nc2 and predetermined value β and is smaller than the second output Nc2 or not (S320). When the condition of the step S320 is satisfied, the ECU 10 performs normal control (S330). The above steps are similar to those of the first fuel injection amount compensation control.

On the other hand, when the condition of the step S320 is not satisfied, the ECU 10 calculates actual injection amount Qr of each of the cylinders with a Nc1/Qr map which shows correlation between the first output Nc1 and the actual injection amount Qr (S340). Next, the ECU 10 calculates command injection amount Qm with a command injection amount map which calculates the command injection amount Qm from engine rotation speed and accelerator opening (S350). Next, the ECU 10 calculates injection amount difference ΔQ between the actual injection amount Qr and the command injection amount Qm (S360). When the injection amount difference ΔQ is smaller than predetermined value w, the injection amount is compensated so as to make the first output Nc1 in agreement with the second output Nc2 (S370). On the other hand, when the injection amount difference ΔQ is larger than predetermined value w, the engine is judged to be extraordinary and an extraordinary flag is set (S370).

According to the construction, at the step S320, momentary supercharger rotation speed at the time of fuel injection of each of the cylinders against the mean supercharger rotation speed can be judged. At the step S360, the magnitude of gap from the command injection amount Qm can be checked.

Accordingly, the two supercharger rotation speed outputs (the first output Nc1 and the second output Nc2) are compared with each other as feedback value, whereby whether the fuel injection amount is compensatable or the engine is extraordinary can be judged without applying operation load on the ECU 10.

Embodiment 4

Figure 11:
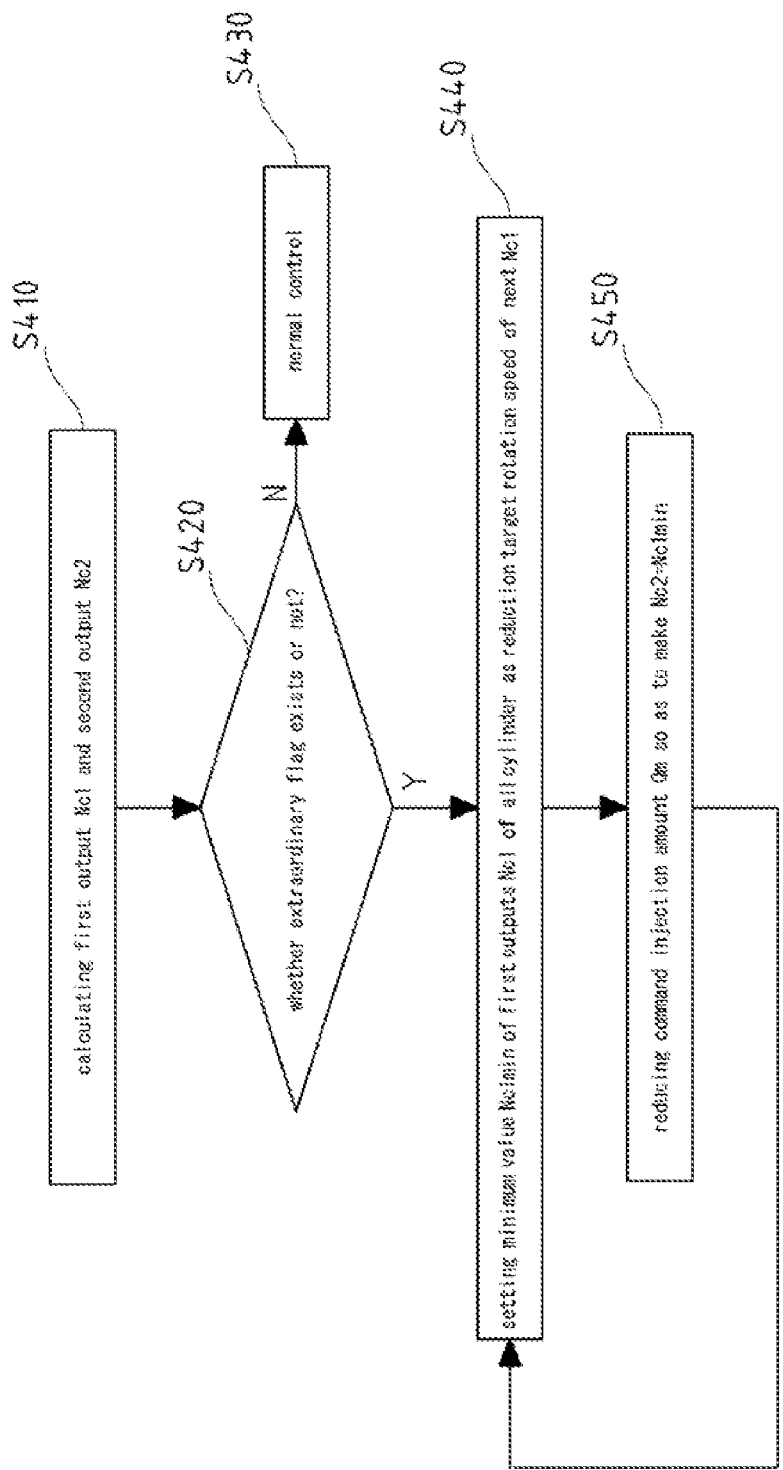
FIG. 11 It is a flow chart of derating control of the same which is an embodiment 4.

Explanation will be given on derating control which is an embodiment 4 referring FIG. 11. When extraordinariness occurs in the engine 1, the ECU 10 reduces rotation speed of the engine 1 with the first output Nc1 and the second output Nc2 by steps at the time of derating.

The ECU 10 calculates the first output Nc1 and the second output Nc2 (S410). Next, the ECU 10 checks whether any extraordinary flag (for example, the step S370 in the second fuel injection amount compensation control) exists or not (S420). When any extraordinary flag does not exist, normal drive is performed (S430).

On the other hand, when any extraordinary flag exists, the minimum value Nc1min of the first outputs Nc1 of all the cylinders is set as reduction target rotation speed (S440). Next, the ECU 10 reduces the command injection amount Qm so as to make the second output Nc2 in agreement with the minimum value Nc1min (S450). The ECU repeats the steps S440 and S450 so as to progress to the target reduction of the derating control.

Explanation will be given on the action of the derating control referring FIG. 12.

Figure 12:
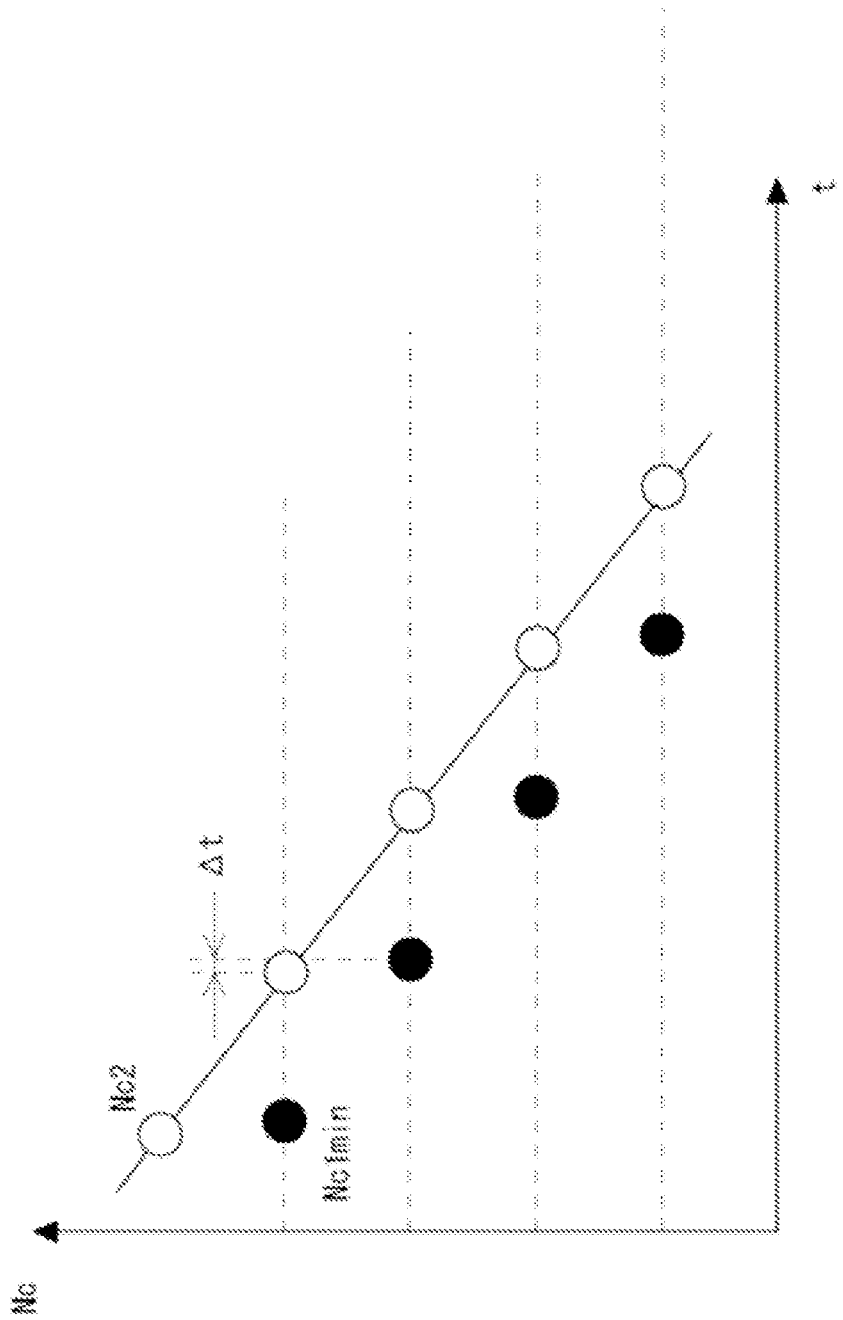
FIG. 12 It is a graph of transition of the derating control of the same.

FIG. 12 is a graph that the axis of abscissas indicates time t and the axis of ordinates indicates rotation speed Nc of the compressor 6. By the derating control, the reduction target rotation speed Nc1min is set by steps and the second output Nc2 is reduced to the reduction target rotation speed Nc1min, whereby the engine 1 progresses to reduction driving. Depending on Δt (set timing of the reduction target rotation speed Nc1min) in the graph or set value of the reduction target rotation speed Nc1min, the deceleration can be controlled freely. Acceleration control of the engine 1 can also be performed by similar means.

Accordingly, the only two supercharger rotation speed outputs (the first output Nc1 and the second output Nc2) are compared with each other as feedback means, whereby the derating control can be performed certainly without applying operation load on the ECU 10.

INDUSTRIAL APPLICABILITY

The present invention is adoptable to an engine having a supercharger.

The invention claimed is:

1. An engine comprising:
an engine base having a plurality of cylinders and a supercharger;
an engine rotation speed detection means;
a supercharger rotation speed detection means that detects rotation of the supercharger as a pulse;
an operation means that divides the pulse by a dividing ratio and calculates it as a divided pulse; and
a control means that judges a surge state of the supercharger, wherein the control means:
   sets a predetermined position of a piston of each of the cylinders in a crank angle of the engine as count start timing of the divided pulses,
   outputs the divided pulse, which is operated based on a time for counting the divided pulse a predetermined number of times from the count start timing of the divided pulse and the predetermined number of times, as a first output, and
   judges that, if a difference between the first outputs of every cylinder is not less than a predetermined value, the supercharger is in the surge state.

2. An engine comprising:
an engine base having a plurality of cylinders and a supercharger;
an engine rotation speed detection means;
a supercharger rotation speed detection means that detects rotation of the supercharger as a pulse;
an operation means that divides the pulse by a dividing ratio and calculates it as a divided pulse; and
a control means that regulates fuel injection amount, wherein the control means:
   sets the divided pulse divided by a predetermined dividing ratio as a first divided pulse,
   sets a predetermined position of a piston of each of the cylinders in a crank angle of the engine as count start timing of the first divided pulse,
   sets the divided pulse, which is operated based on a time for counting the divided pulse a predetermined number of times from the count start timing of the divided pulse and the predetermined number of times, as a first output,
   outputs as a second output a second divided pulse divided by a larger dividing ratio than the first divided pulse,
   judges for each of the cylinders whether a difference between the first output and the second output makes the cylinder a fuel injection amount mismatching cylinder, and
   regulates fuel injection amount of the fuel injection amount mismatching cylinder so as to make the difference not more than a predetermined value.

3. An engine comprising:
an engine base having a plurality of cylinders and a supercharger;
an engine rotation speed detection means;
a supercharger rotation speed detection means that detects rotation of the supercharger as a pulse;
an operation means that divides the pulse by a dividing ratio and calculates it as a divided pulse; and
a control means that judges whether the engine is extraordinary or not and regulates fuel injection amount so as to reduce speed of the engine when the engine is judged to be extraordinary,
wherein when the engine is judged to be extraordinary, the control means:
   sets the divided pulse divided by a predetermined dividing ratio as a first divided pulse,
   sets a predetermined position of a piston of each of the cylinders in a crank angle of the engine as count start timing of the first divided pulse,
   sets the divided pulse, which is operated based on a time for counting the divided pulse predetermined a number of times from the count start timing of the divided pulse and the predetermined number of times, as a first output,
   outputs a second divided pulse divided by larger dividing ratio than the first divided pulse as a second output, and
regulates the fuel injection amount so as to make the second output in agreement with the minimum output of the first outputs in one cycle.

* * * * *